Figure 1:
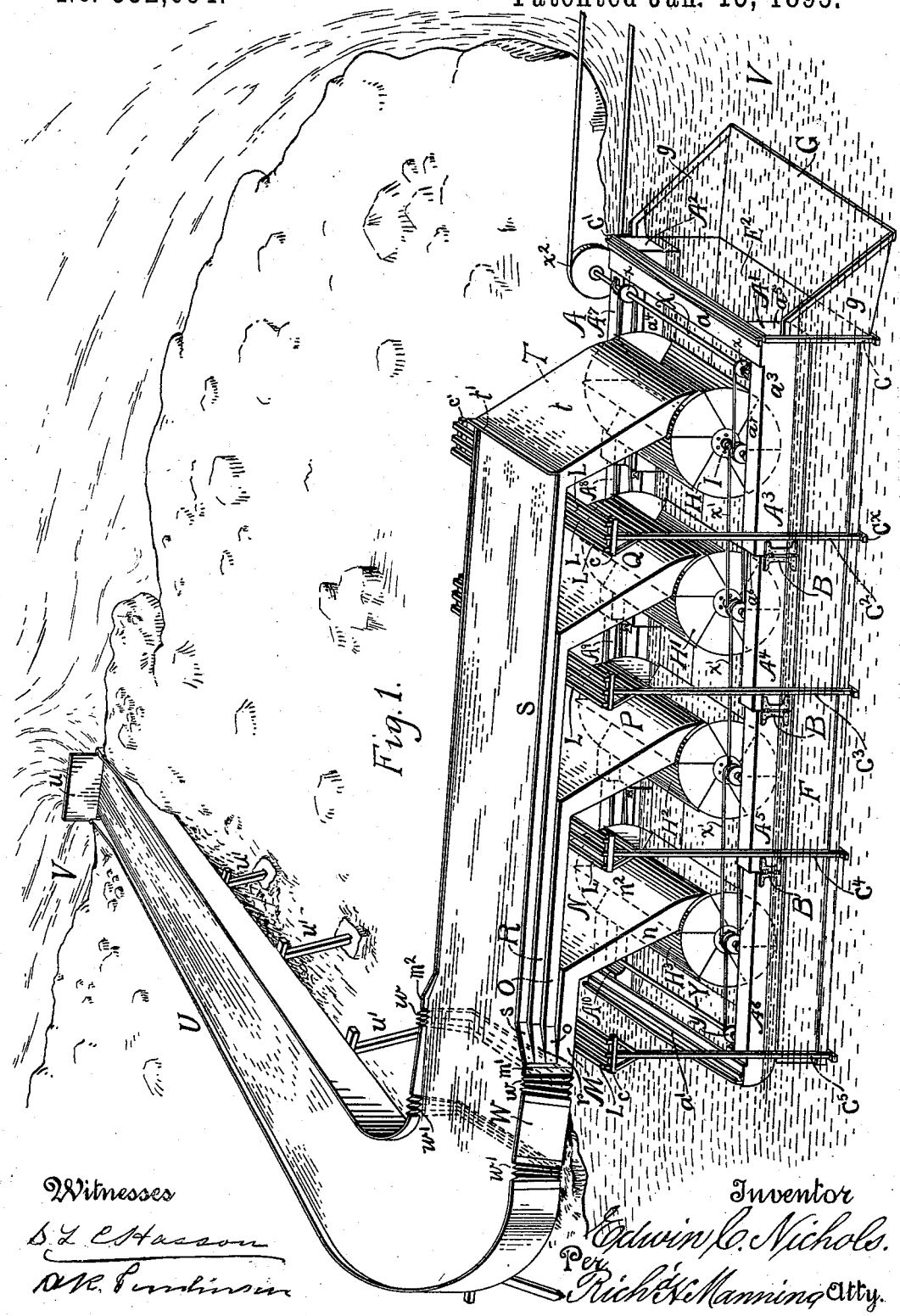

(No Model.) 3 Sheets—Sheet 1.

E. C. NICHOLS.
HYDRAULIC MOTOR.

No. 532,694. Patented Jan. 15, 1895.

Witnesses
Inventor
Edwin C. Nichols.
Per Rich'd H. Manning Atty.

(No Model.) 3 Sheets—Sheet 2.
E. C. NICHOLS.
HYDRAULIC MOTOR.
No. 532,694. Patented Jan. 15, 1895.
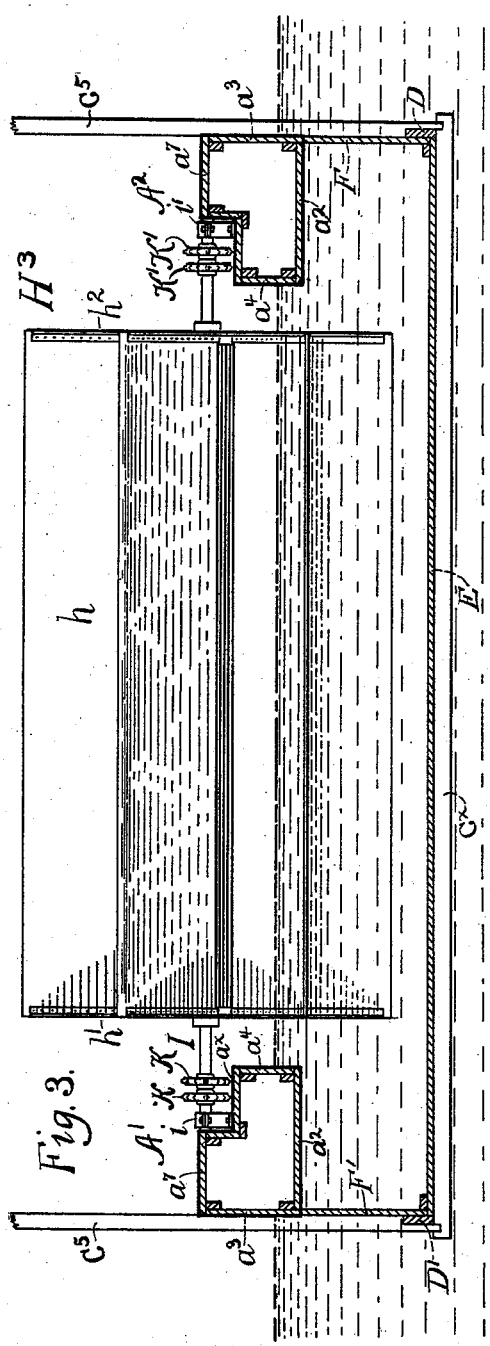
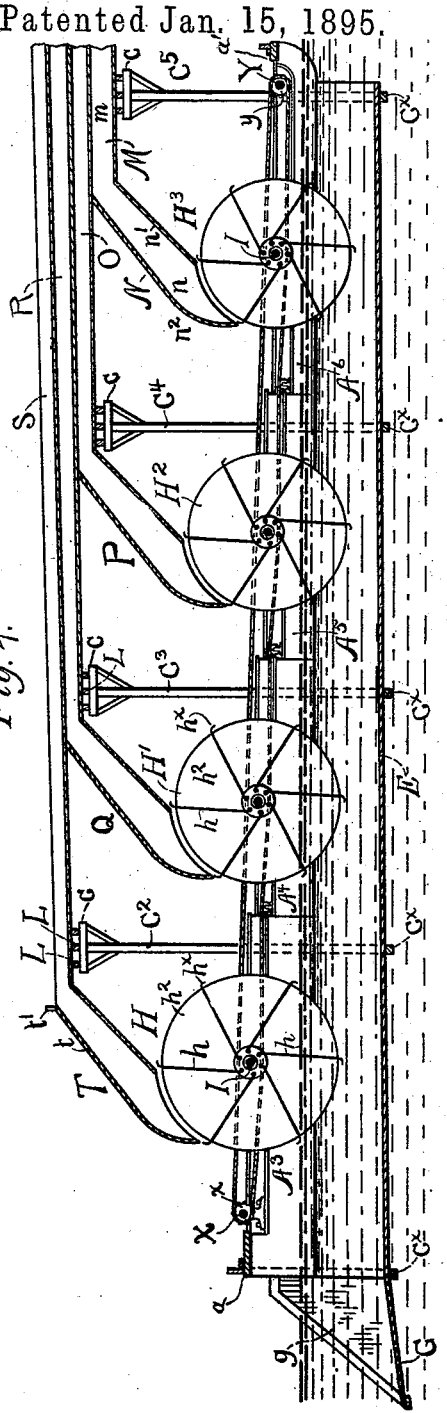
Witnesses
Inventor
Edwin C. Nichols
By his Attorney
Rich. N. Manning

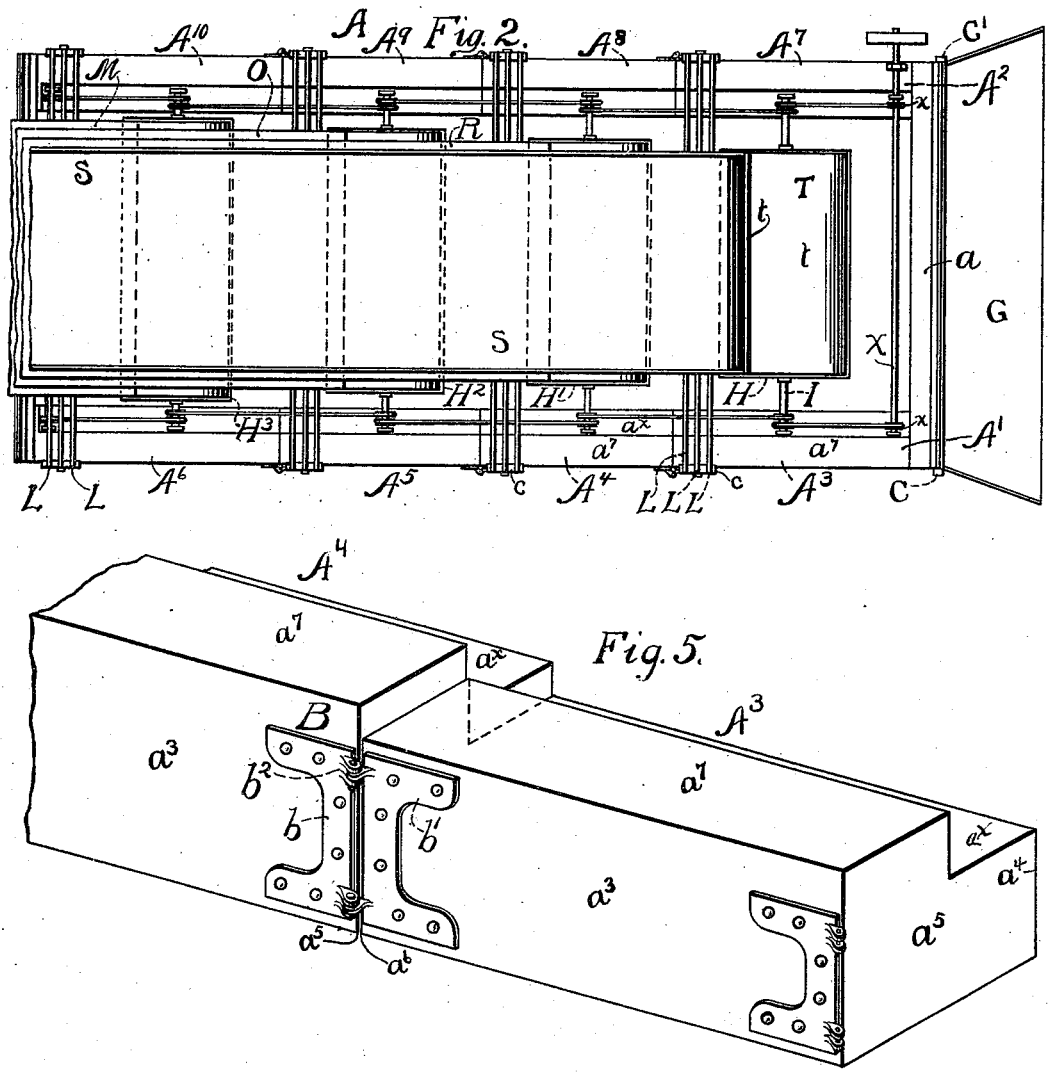

UNITED STATES PATENT OFFICE.

EDWIN C. NICHOLS, OF KANSAS CITY, MISSOURI.

HYDRAULIC MOTOR.

SPECIFICATION forming part of Letters Patent No. 532,694, dated January 15, 1895.

Application filed December 21, 1893. Serial No. 494,259. (No model.)

*To all whom it may concern:*

Be it known that I, EDWIN C. NICHOLS, a citizen of the United States, residing at Kansas City, in the county of Jackson and State of Missouri, have invented certain new and useful Improvements in Hydraulic Motors; and I do hereby declare that the following is a full, clear, and exact description thereof, such as will enable others to make and use the same, reference being had to the accompanying drawings, forming a part of this specification.

My invention has for its object, first, to communicate power to the motor from separate energizing flowing streams; second, to energize with separated parts of the motor actuated by the water; third, to energize overshot wheels varying in diameter with separate falling streams of water graduated in amount; fourth, in a water wheel motor to enable each wheel in a series to be energized simultaneously by the interrupted flowing stream.

My invention further consists in the novel construction and combination of parts such as will first be fully described and specifically pointed out in the claims.

In the drawings: Figure 1, is a view in perspective of the hydraulic motor in a flowing stream showing the separate over-shot conductors, and the separate stream leading to said conductors, and the yielding connections for the conductors. Fig. 2, is a plan view of the motor and the water conductors to the over shot wheels supported by the floats. Fig. 3, is a detail cross sectional view of the hydraulic motor, taken beneath the water conductors showing the floats and bottom of the sluice, and one of the water propelled compartment wheels. Fig. 4, is a longitudinal sectional view of the motor and water conductors, supported by the floats, as seen in Fig. 1. Fig. 5, is a detail view in perspective of one of the separate air tight compartments, forming a portion of one of the floats, and a broken portion of an adjacent compartment showing the hinged connections.

Similar letters of reference indicate corresponding parts in all the figures.

In carrying out my invention, and referring to the drawings, A represents a vessel for the support of the water wheels and water conductors, which is composed of longitudinal floats $A'$. $A^2$, supported by their own buoyancy in the flowing stream, and fixedly arranged in a parallel position and at the proper distance apart by means of connecting beams, $a$. $a'$. The beam $a$ extends transversely from the forward end and top portion of one float $A'$ to the forward end and top portion of the float $A^2$, and the beam $a'$ extends from the rear end and top portion of the float $A'$ to the rear end and top portion of the float $A^2$.

The float $A'$ is composed of separate buoyant parts $A^3$ $A^4$ $A^5$ $A^6$, each part being constructed short in length, and thus made available for transportation. (See Fig. 5).

The part $A^3$ of the float $A'$, which is at the forward end of the vessel exceeds in depth, that part of the other floats and is made with a bottom $a^2$, longitudinal sides $a^3$, $a^4$, which extend upward from the bottom at right angles thereto, and ends $a^5$ $a^6$. The inner side $a^4$ of the float extends in height about two thirds the distance described by the outer side $a^3$. The top $a^4$ of the float extends from the upper edge of the side $a^3$ in a horizontal line in the direction of the inner side $a^4$ to a point equi-distant from said sides, at which point the top extends in a downward direction to a position in line horizontally with the upper edge of the side $a^4$; thence extended to the upper edge of the said inner side $a$, thus forming a recess or step $a^x$, in the top of the float $A^3$. Said part $A^3$ of float $A'$ is made impervious to water in the well known manner. The part $A^4$ of float $A'$ is made in the same manner as the part $A^3$, the sides $a^3$ $a^4$, however being made in a corresponding degree less in height than the sides to the part $A^2$; thus forming a step between adjacent ends of said floats. The part $A^5$ is also made with its sides in a corresponding degree less in height than that of the part $A^4$, and the sides of the part $A^6$ are made in a corresponding degree less in height than the sides of the part $A^5$, thus forming in the top of the float $A'$ from the forward to rear end a series of descending steps at the point of junction of each separate part of the float, the bottom of each part of the float preserving one horizontal line.

The separate parts $A^3$ $A^4$ of the float are joined together by means of the hinge B, one leaf $b$ of which is attached rigidly to the outer side $a^3$ of the part $A^3$, and at one end of the said part and the other leaf $b'$, to the outer side, and adjacent end of the part $A^4$ of the float $A'$, the pintle $b^2$ being removable. The parts $A^4$, and $A^5$ and $A^6$ of the float $A'$ are removably hinged together in precisely the same manner as the parts $A^3$ $A^4$. The other float $A^2$ is composed of separate parts $A^7$, $A^8$, $A^9$, $A^{10}$, which are of corresponding length and constructed precisely the same and hinged together in like manner as the separate parts $A^3$, $A^4$, $A^5$, $A^6$ of float $A'$.

To the outer side of the part $A^3$ of float $A'$, and at the forward end is attached rigidly a standard C, which extends from the line of the upper side of said part downwardly a considerable distance below the line of the bottom of said float.

To the outer side and forward end of the part $A^7$ of the float $A^2$ is attached a standard $C'$, which extends in a downward direction, the same distance as the standard C.

To the outer side of the part $A^3$ of float $A'$, and near the rear end of said part is rigidly attached a standard $C^2$, which extends in a downward direction below the line of the bottom of the float to a position a slight degree above the horizontal line described by the lower ends of the standards C. $C'$. The standard $C^2$ extends in an upward direction to a considerable height above the line of the top of said part $A^3$ of said float, so as to support the conductors of the water, which are elevated the highest in degree.

To the outer side of the part $A^4$ of float A, and near the rear end of said part is rigidly attached a standard $C^3$, which extends in a downward direction to a position a slight degree above a horizontal line described by the lower end of the standard $C^2$, and in an upward direction above the line of the top of said part of said float to a position a slight distance below a horizontal line drawn upon the upper end of the standard $A^4$.

To the outer side of the part $A^5$ is attached rigidly near the rear end of said part a standard $C^4$, which extends in a downward direction below the line of the bottom of the float to a position a short distance above the horizontal line of the lower end of the standard $C^3$, and in an upward direction to a position a slight degree below a line horizontal with the upper end of the said standard.

To the outer side of the part $A^6$ of float $A'$ and near the rear end of said float is rigidly attached a standard C, which extends below the line of the bottom of the float to a position a short distance above the line of the lower end of the standard $C^4$, and in an upward direction to a position a short distance below the line of the upper end of the said standard. Upon the outer side of the other float $A^2$ and to each separate part $A^7$, $A^8$, $A^9$, $A^{10}$ are attached similar standards, which extend below the line of the under side of the float, and also above the upper side of top of the float at the same distance as described by the corresponding opposite standards $c^2$ $c^3$ $c^4$.

To the lower end of the standard C is attached at one end a cross beam $C^x$, the other end of which beam is attached to the lower end of the standard $C'$. Similar cross beams $C^x$ are attached to the lower ends of each of the other standards, which are opposite each other on both sides of the vessel A, extending from the lower end of standard C, rearwardly to the standard $C^5$, and from the inner side of beam D, beneath float $A'$ to the inner side of beam D beneath float $A^2$, and extending firmly to the upper side of each cross beam $C^x$, the floor E inclining at an angle to the bottom of the floats $A'$ $A^2$ and downwardly in the direction of the standards C. $C'$.

Upon the inner sides of the standards C. $C^2$ $C^3$ $C^4$ and extending from the bottom E upwardly to the under side of the float $A'$ and from standard C to the standard $C^4$ is a plank siding F. Beneath the float $A^2$, and extending the same distance, and attached rigidly to the inner sides of the standards on said float is a similar side portion $F'$, beneath which sides and the bottom E is the sluice $E^2$.

Attached to the bottom E at the forward end of the vessel A is an apron G, which extends forward a short distance, and is inclined downwardly at an angle to the said bottom E. The apron G is supported in position by triangular formed sides $g$, $g$, which extend from the outer end of the apron to the upper ends of standards C. $C'$ respectively.

The motors upon the floats $A'$ $A^2$ consist of separate compartment water wheels H, $H'$, $H^2$, $H^3$. The wheel H is constructed as follows: To the shaft I is attached the ends $h'$, $h^2$, which consist of circular flat plates, which are of the required diameter. Parallel with the shaft I, is a series of rods, which extend through the ends $h'$, $h^2$ of the wheel, and to which rods the inner edges of the blades $h$, $h$, $h$, are secured tangentially to the shaft I, and between which rods the air compressed by the action of the wheel finds its escape. The outer edges of the blades $h$, $h$, extend a slight distance beyond the line of the periphery of the sides $h'$, $h^2$, and are curved in a downward direction in a slight degree. The other wheels $H'$, $H^2$, $H^3$ are in construction the same as wheel H. In proportion however, the wheel H is the smallest in length, and the sides greater in diameter than any one of the other wheels.

The shaft I of wheel H is mounted at one end in the journal box $i$, which is fixed on the part $A^3$ of the float $A'$, and upon the lower step $a^x$ of the top $a^7$ of said float, at a point equi-distant from both ends of said part $A'$. The other end of said shaft is journaled in the box $i'$ on the float $A^2$, and upon the corresponding portion of the part $A^7$ of said float as described on float $A'$. On the end of shaft I, near the box $i$, are sprocket wheels K, K, which are close in position to each other. Upon the other end of said shaft near box $i$, are sprocket wheels K', K'. Upon the other respective parts $A^4$, $A^8$, $A^5$, $A^9$, $A^6$, $A^{10}$ of the respective floats A', $A^2$ are similar journal boxes $i, i'$, which are arranged in the same location upon each part as upon the parts $A^3$, $A^7$. The positions of the journal boxes however in each part of each float are a step below each other.

The wheel H' is a slight degree less in diameter than the wheel H, and also a degree longer than said wheel, and is mounted in rear of the wheel. The wheel $H^2$ is a degree less in diameter than wheel $H^3$, and also a degree longer than the wheel $H^3$ is a degree less in diameter than the wheel $H^2$, and a degree longer, the wheel H, H', $H^2$, $H^3$, however, being successively submerged at an increased depth beneath the surface of the water.

To the upper end of the standard $C^2$ on float A' is secured a short beam $c$, which extends horizontally in the line of direction of float A, and upon the upper side of which beam is secured one end of each of the rails L, L, L, which are in a parallel position and the other ends of said rails extend in a transverse direction to the floats, and are secured to the short beam $c'$, which caps the standard upon the float $A^2$. Upon the other standards $C^3$, $C^4$, $C^5$, upon float A', and also upon the standards opposite $C^3$, $C^4$ $C^5$ on float $A^2$ are similar supports C' C', and beams L, L, L arranged in precisely the same manner as upon the standards $C^3$, $C^3$, the reduced length of each standard in degree from the forward to the rear end of the floats, fixing the position of the respective heights of the rails L, L, L on each standard.

For the purpose of conducting the water to a position above each wheel and to energize each wheel in its fall, upon conduit M are mounted at one end the rails L, L, L, on the standards $C^5$, $C^5$ on the rear ends of the floats A', $A^2$, and the other end is extended a short distance in the direction of the forward end of the vessel A. The conduit is made with a flat bottom and vertical sides $m, m$, the width of said conduit being equal to the length of the wheel $H^3$.

To the forward end of conduit M is attached rigidly a branch conductor or chute N, the bottom $n'$ of which is extended forward of a vertical line drawn through the shaft of wheel $H^3$, and inclined downwardly and nearly to the periphery of the said wheel. The upper edges of the sides $n, n$, of chute N, extend also in a downward direction and in an outwardly curved line so as to describe between the said outer edge and the bottom of the chute nearly the distance between the outer edges of both blades $h, h$, of wheel H, which form the sides to each compartment of the wheel. The end of the sides $n, n$, of chute N is curved inwardly in the described line of the periphery of the side of the wheel $H^3$.

Extending from the upper edge of one side $n$ of chute N to the upper edge of the other side is a front portion or cover $n^2$, which extends from the junction of the sides $m$ of the conduit M with the sides $n, n$, of chute N, and downwardly nearly to the periphery of the wheel $H^3$.

Above the conduit M and extending from a point within the line of the outer end of the conduit M toward its support L, is a conduit O, the width of which is less than the conduit M, and nearly equal to the length of the wheel $H^2$. The forward end of the conduit extends to a position in line vertically with the forward rail support L, on standard $C^4$, and upon said forward end is a forwardly and downwardly inclined chute P, the lower end of which extends over the compartment of wheel $A^2$ in precisely the same manner as chute N over the wheel $H^3$. The rear end of the conduit O rests upon the upper edge of the cover $n^2$ of the chute N.

Above the conduit O is a conduit R, which extends from the position of the conduit O on the support L on standards $C^5$ forward to and a short distance beyond the supports L, L, on the standards $C^3$ $C^3$, and terminates in a chute G, which extends to the wheel H' in the same manner as the chute P to the wheel $H^2$, the central portion of the conduit being supported on the upper edge of the cover to said chute P. Above the conduit R is a conduit S, which extends from the same position on the supports L on standards $C^5$ forward to the supporting rails L on the standards $C^2$ $C^2$, and which also terminates in a downwardly inclined chute T, which conduit and chute are contracted in width and so as to correspond with the length of the wheel H, to which they extend in precisely the same manner as each one of the chutes previously described. The upper edge of the cover $t$ of chute T is provided with an upwardly extended strip $t'$, which prevents the overflow of water.

To the end and both sides of $m$ $m$ of conduit M on the supports L on the standards $C^5$ are attached vertical extensions $m'$ $m^2$. To the strips $m'$, $m^2$ above the conduit M is attached a short side strip $o$, which extends inwardly and is attached to adjacent side of the conduit O. From said strip extend also inwardly inclined sides $r, s$, to each side of the respective conduits R and S. Upon one side of the conduit and upon the other side of the conduit are similar strips which extend on similar strips, which extend from the vertical strip $m^2$ in like manner.

For the purpose of conducting a branch stream of water to the overshot wheels on the vessel A, an artificial conduit or flume U is constructed, which extends from the source or head waters of the river downwardly and as shown at nearly right angles to the conduits on the vessel A.

The hydraulic motor is placed in an ordinary mountain stream V, which has its source V' at a high elevation on the slope of mountain ranges, the tortuous course of the stream winding downwardly in the sides of the mountain, where the resistance to the passage of the water is least. For this purpose the stream above is divided from the stream below on which the hydraulic motor is made fast by the upper end of the flume U, which is pivoted with a sluice gate $u$. The flume U is constructed with sides and bottom of sufficient width and depth to carry a large volume of water, and is supported upon trussels $u'$, $u'$. The lower end of the flume or conduit U is elevated to the height of the supports L, L, on the standards $C^5$, $C^5$ on the floats $A'$ $A^2$ the sides of the flume describing a curved line toward the inlets to each conduit upon the vessel A; the height of the sides of the flume Y being equally as high as the described height of the strips $m'$, $m^2$ on the conduit M. To permit the fall of the vessel A, when the water in the river diminishes in height, a short portion or section of a conduit W is provided with bellows connection, $w$, $w$ at one end which is connected with the respective strips $m$, $m^2$ and with the bottom of the conduit M. At the other end of the portion W of the conduit is a similar bellows connection $w'$, $w'$ the parts of which are connected with the lower end of the flume or conduit U. Upon the forward end of float $A'$ is journaled near the transverse beam $a$ one end of a power shaft X, the other end of which shaft is journaled upon the float $A^2$, both journal boxes being placed on the recess $a^x$, $a^x$ of said floats. Upon the shaft X are sprocket wheels $x$ $x$, which are in line with the sprocket wheels K. K. on the shaft I of the water wheel H. Over the sprocket wheel $x$ on the shaft X is extended one end of a sprocket chain $x'$, the other end of which is passed over the sprocket wheel K on the shaft I of wheel H in line therewith, and the two ends connected together in the usual manner. Over the other sprocket wheel on the same end of shaft I is passed one end of a separate sprocket chain, the other end of which chain is passed over the sprocket wheel on the shaft of the wheel $H'$ on line therewith, and the two ends of the chain being connected in like manner. Similar sprocket chains are passed over corresponding sprocket wheels on the respective shafts of the wheels $H^2$, $H^3$, and also over the sprocket wheels upon the other ends of the shafts of the respective wheels H $H'$, $H^2$, $H^2$, $H^3$. Upon the rear end of the float $A'$ is journaled near the transverse beam $a'$ one end of a power shaft Y, the other end of which shaft is journaled on the float $A^2$, and provided with sprocket wheels $y$, $y$ over which extend the sprocket chains from the sprocket wheel on the wheel $H^3$. The end of the shaft X on the float $A^2$ is extended a short distance outwardly beyond the outer side of said float, and upon which end is mounted a power transmitting pulley $x^2$, over which is passed a belt $x^3$, which may be extended to communicate the power required in the well known manner.

In the operation of the motor, the stream is admitted within the sluice E, which passes unobstructed along the sides of the sluice way and the current of water actuating each water wheel a separate portion of the stream, striking direct one or the other of the wheels H, $H'$, $H^2$, $H^3$, and without being obstructed in its flow, energizes each wheel; that portion of the water actuating the wheel H, passing subsequently each side of said wheel to the wheel in rear, thus obtaining the full momentum of the stream. In passing within the sluice and upwardly upon the inclined bottom E, the water in passing through the contracted area of passage formed by the sluice is increased in velocity and therefore communicates an increased rapidity to movement of the water wheels H, $H'$, $H^2$, $H^3$. This movement is communicated to the power transmitting shafts and pulleys on the floats, as shown and described. The sluice gate $u$ being opened, the water from the separate source above the motor is admitted to the flume, and passes rapidly to each conduit, and thence to the chutes that overflowing the sides of the conduits R. S, falling into the conduits below, and then falls upon the blades of each water wheel, which are presented to each chute at the same angle and at the same time, the position of the blades being thus arranged in completing the sprocket chains with the sprocket wheels in the usual manner. The power thus obtained from the water through the chutes increases the energy of the water wheels, and enables the transmission of the combined power obtained from the momentum of the stream, and the fall of water over shot from a separate stream, which may be a part of the main stream in the manner described.

The flume is arranged at the lower end at the height and in connection with the conduits in the vessel A, during the time the water in the river is at the highest point, so that the yielding connections permit of the fall of the conduits in the requisite degree. The water which falls through the lower shute M, enters a compartment of the water wheel of greater length but smaller in diameter, which is offset by the wheel H, which though short in length is of an increased diameter and in like manner the capacity of the compartments for receiving the flow of the water is equalized in the other wheels, while at the same time in the arrangement of the shafts of the water wheels upon declining steps in each float the depth of each wheel in the water is increased in succession and the power of the flowing stream utilized in every available direction.

Having fully described my invention, what I now claim as new, and desire to secure by Letters Patent, is—

1. In a hydraulic motor consisting of side floats, having an intermediate sluice, and water actuated compartment wheels, mounted upon said floats and within said sluice of a series of elevated water conductors, separately extended to each water wheel, and having an elevated common source of supply, substantially as and for the purpose described.

2. In a hydraulic motor consisting of side floats, having an intermediate sluice and water actuated compartment wheels mounted upon said floats, and within said sluice of elevated water supply conductors upon said float, and a series of separately connected over shot water chutes, each one extending to a separate water wheel substantially as and for the pupose described.

3. In a hydraulic motor consisting of side floats, having an intermediate sluice a series of water actuated compartment wheels mounted upon said floats and extending within said sluice and having the dimensions of the compartments of separate wheels in said series unequal, and an elevated wafer conductor having separate distributing conductors of unequal dimensions extending to the respective water wheels substantially in the manner described.

4. In a hydraulic motor consisting of side floats having an intermediate sluice and water actuated devices upon said float of standards upon said floats, having transverse rails unequal in height and water conductors supported by said rails and having downwardly inclined water chutes substantially as and for the purpose described.

5. In a hydraulic motor consisting of side floats, having an intermediate sluice and water actuated devices upon said floats, of water conductors upon said floats, and a separate elevated supply water conductor, and an elevated source of supply of the liquid in communication and a flexible connection between the said elevated supply conductor and the conductor on said floats as and for the purpose described.

EDWIN C. NICHOLS.

Witnesses:
S. L. C. HASSON,
H. R. TOMLINSON.